United States Patent
Takasaki et al.

(10) Patent No.: US 6,842,208 B2
(45) Date of Patent: Jan. 11, 2005

(54) LIQUID CRYSTAL DISPLAY AND MANUFACTURING PROCESS THEREOF

(75) Inventors: Ichiro Takasaki, Kumamoto (JP); Yasuhiro Morii, Kumamoto (JP); Masaya Mizunuma, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 205 days.

(21) Appl. No.: 09/881,753

(22) Filed: Jun. 18, 2001

(65) Prior Publication Data

US 2001/0028425 A1 Oct. 11, 2001

Related U.S. Application Data

(62) Division of application No. 09/376,057, filed on Aug. 17, 1999, now Pat. No. 6,268,896.

(30) Foreign Application Priority Data

Aug. 7, 1998 (JP) ............................................. 10-224179

(51) Int. Cl.⁷ ....................... G02F 1/1333; G02F 1/1345
(52) U.S. Cl. ........................ 349/110; 349/149; 349/153; 349/190
(58) Field of Search ......................... 349/153, 110–111, 349/149, 190

(56) References Cited

U.S. PATENT DOCUMENTS

| | | | |
|---|---|---|---|
| 4,222,635 A | * 9/1980 | Julke | 349/190 |
| 5,889,569 A | 3/1999 | Okamoto et al. | 349/110 |
| 5,959,712 A | * 9/1999 | Morii et al. | 349/190 |
| 6,104,467 A | * 8/2000 | Nakahara et al. | 349/189 |
| 6,115,097 A | 9/2000 | Yamazaki | 349/153 |
| 6,118,509 A | 9/2000 | Miyake | 349/153 |
| 6,124,917 A | * 9/2000 | Fujioka et al. | 349/153 |
| 6,400,439 B1 | * 6/2002 | Fujioka et al. | 349/153 |
| 6,424,394 B1 | * 7/2002 | Morii | 349/110 |

* cited by examiner

*Primary Examiner*—Toan Ton
(74) *Attorney, Agent, or Firm*—McDermott Will & Emery LLP

(57) ABSTRACT

The invention provides a small-sized liquid crystal display in which a frame region of an outer peripheral portion of a display region is made small without any light leak at peripheral portion of the display region of a liquid crystal display panel. The invention also provides a manufacturing process of such a liquid crystal display.

Periphery shading films (shade films 3a and 3b) of a display region of a liquid crystal display panel are alternately formed on a first substrate 1 (shade film 3a) and a second substrate 2 (shade film 3b) oppositely arranged, and a transparent portion (width Q) for irradiating a seal resin 4 used to adhere the two substrates forming the liquid crystal display panel with ultraviolet rays 7 is provided within a region (width P) where the periphery shading films are formed.

4 Claims, 17 Drawing Sheets

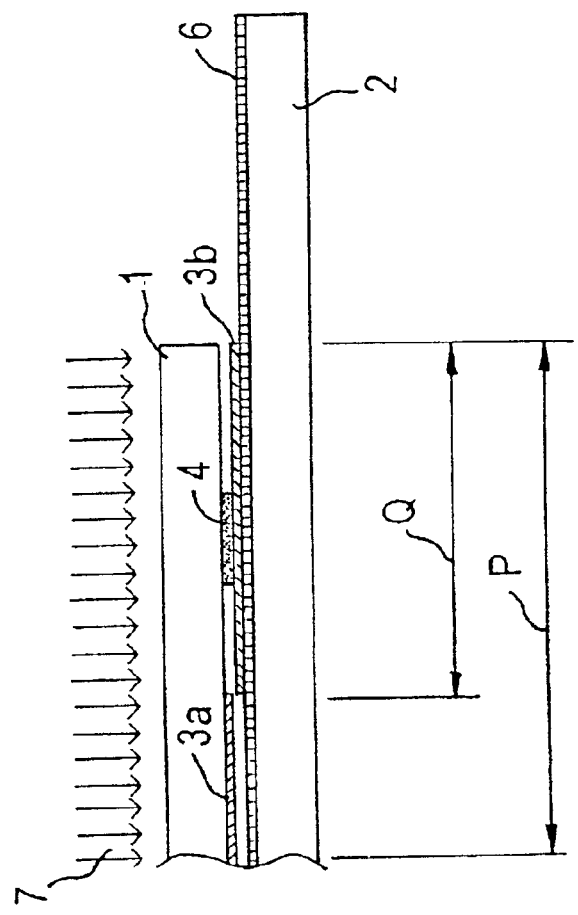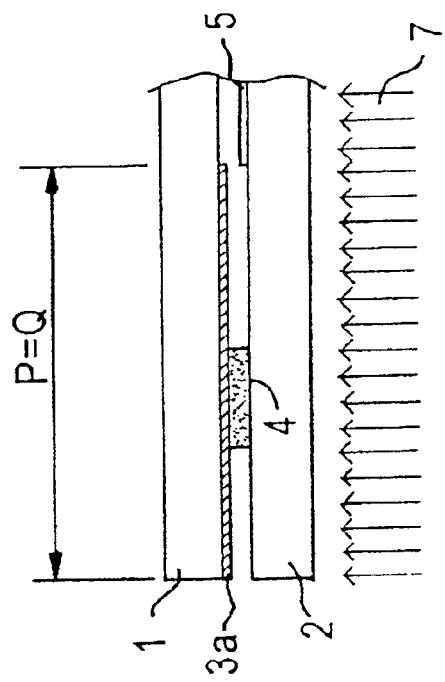
FIG. 4(a)
FIG. 4(b)

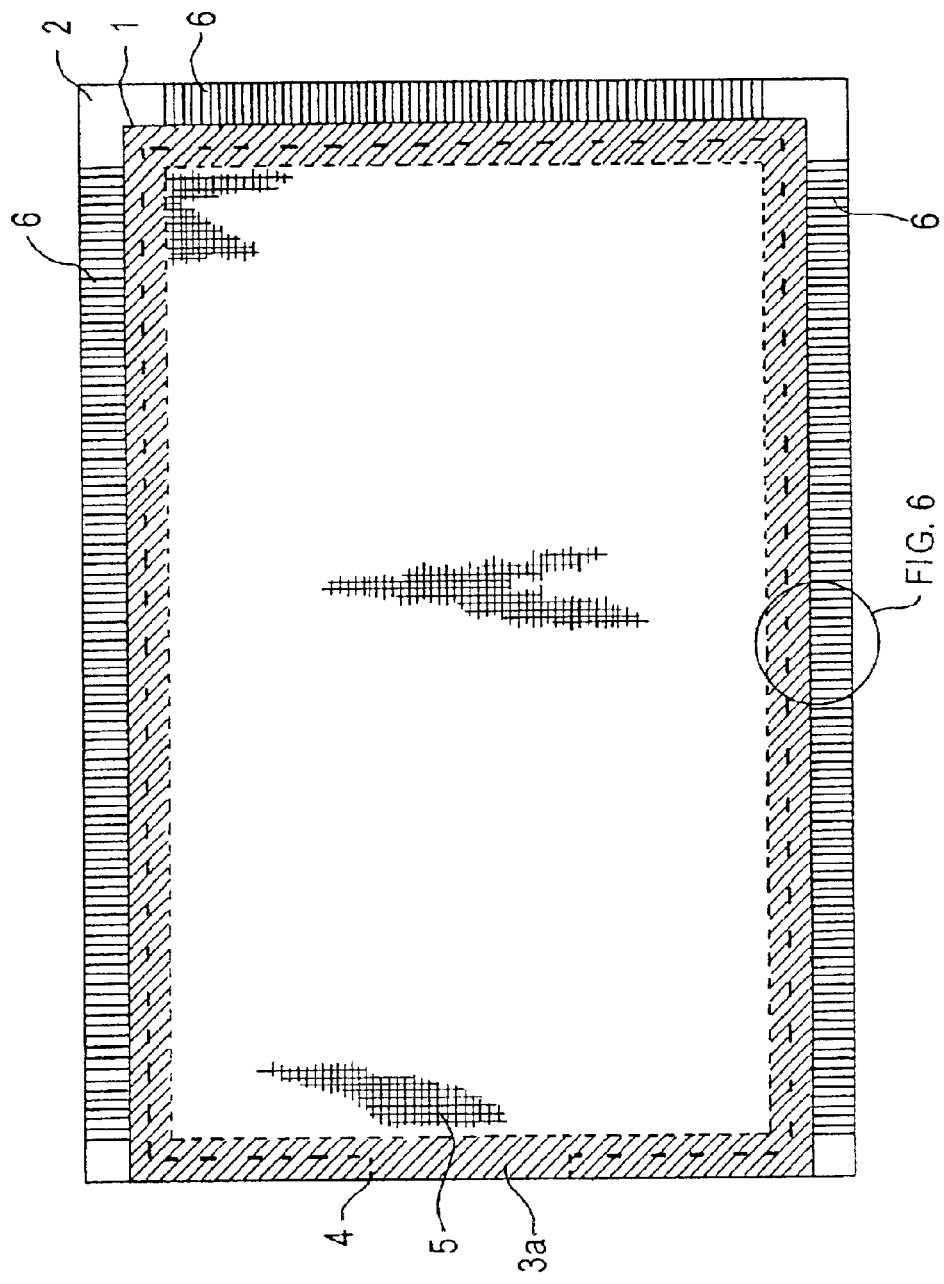

LIQUID CRYSTAL DISPLAY AND MANUFACTURING PROCESS THEREOF

This application is a divisional of application Ser. No. 09/376,057 filed Aug. 17, 1999 now U.S. Pat. No. 6,268,898.

BACKGROUND OF THE INVENTION

1. Field of the Invention

The present invention relates to a liquid crystal display and to a manufacturing process thereof.

2. Prior Art

FIG. 17 is a schematic plan view showing a liquid crystal display panel of a conventional liquid crystal display, FIG. 18(a) is a schematic sectional view taken along the line J—J of FIG. 17, and FIG. 18(b) is a schematic sectional view taken along the line K—K of FIG. 17.

In the drawings, reference numerals 1 and 2 indicate a first substrate and a second substrate oppositely arranged; numeral 3a indicates a shade film formed on the first substrate 1; numeral 4 indicates a seal resin of ultraviolet ray hardening type; numeral 5 indicates a display electrode for displaying a picture formed on the second substrate 2; numeral 6 indicates a display electrode, electrode leading wire, insulating film, etc. (hereinafter referred to as electrode leading wire, etc.) formed on the outside of a display region of the second substrate 2; and numeral 7 indicates ultraviolet rays with which the seal resin 4 is irradiated for hardening.

In the conventional liquid crystal display of above arrangement, the first substrate 1 and the second substrate 2 arranged oppositely are adhered to each other, and the seal resin 4 of ultraviolet ray hardening type for sealing a liquid crystal held between the first substrate 1 and the second substrate 2 is applied to a transparent portion where at least either the first substrate 1 or the second substrate 2 is transparent, and the applied seal resin 4 is hardened from the transparent substrate side by irradiation with the ultraviolet rays 7. In addition, as a film for shading the ultraviolet rays such as electrode leading wire, etc. 6 is formed in the peripheral portion of the second substrate 2, the irradiation with the ultraviolet rays 7 is generally performed from the first substrate 1 side.

Since the conventional liquid crystal display is arranged as mentioned above, as shown in FIG. 18(a), in the peripheral portion of the first substrate 1, it is necessary to secure a transparent portion having a width Q for irradiating the seal resin 4 with the ultraviolet rays 7 on the outside of a portion where the shade film 3a having a width P for shading a display region is formed. Thus, it is necessary for a width R of a frame region being an outer periphery of the display region to have a width formed by putting together the width P and the width Q. Hence, a problem exists in that the liquid crystal display cannot be small-sized.

Further, when making small the width R of the frame region of the outer periphery of the display region while securing the width Q of the transparent portion for irradiating the seal resin 4 with the ultraviolet rays 7, the region for forming the shade film 3a to shade the periphery of the display region becomes insufficient. Hence, another problem exists in that a light leak takes place in the peripheral portion of the display region, eventually resulting in poor display quality.

Furthermore, when the irradiation with the ultraviolet rays 7 is performed from the second substrate 2 side where the shade film 3a for shading the periphery of the display region is not formed, the ultraviolet rays are shaded by the electrode leading wire, etc. 6 formed in the peripheral portion of the second substrate 2. Hence, a further problem exists in that the hardening of the seal resin 4 at this portion is not perfect.

SUMMARY OF THE INVENTION

The present invention was made to solve the above-discussed problems and has an object of providing a small-sized liquid crystal display in which the frame region of the outer peripheral portion of the display region is made small without any light leak at the peripheral portion of the display region. Another object of the invention is to provide a manufacturing process suitable to such a liquid crystal display.

To accomplish the foregoing object, a liquid crystal display according to the invention comprises: a first substrate having a shade film formed in contact with an outer edge portion of a display region; a second substrate having a display electrode for displaying on a picture plane, an electrode leading wire having a shading characteristic and lead from the display electrode to outside of the display region, and a shade film formed on the outside of the display region; and a seal resin of ultraviolet ray hardening type to adhere said first substrate and the second substrate oppositely to each other and for sealing a liquid crystal held between the first substrate and the second substrate; in which the shade film formed on the first substrate and the shade film formed on the second substrate are formed to be continuous between the first substrate and the second substrate oppositely arranged, the shade film is formed either on the first substrate or on the second substrate in a portion where the seal resin is applied, and ultraviolet rays can transmit through the remaining substrate.

Another liquid crystal display according to the invention comprises: a first substrate having a shade film formed in contact with an outer edge portion of a display region; a second substrate having a display electrode for displaying on a picture plane and a shade material such as electrode leading wire lead from said display electrode to outside of the display region; a seal resin of ultraviolet ray hardening type for adhering said first substrate and the second substrate oppositely to each other and for sealing a liquid crystal held between the first substrate and the second substrate; and a plurality of slits formed on the shade film and on the shade material for transmitting ultraviolet rays to a seal resin applied portion; in which the slits are arranged alternately between the first substrate and the second substrate arranged oppositely.

It is preferable that the slits are arranged alternately between the first substrate and the second substrate arranged oppositely in the seal resin applied portion, and the ultraviolet ray transmitting portions thereof are formed to be continuous.

It is preferable that the slits are arranged alternately between the first substrate and the second substrate arranged oppositely in the seal resin applied portion, and the ultraviolet ray transmitting portions thereof are formed to be discontinuous.

It is preferable that the slits are formed into an optional secondary dimensional shape as occasion demands.

A manufacturing process of a liquid crystal display according to the invention includes a step of hardening a seal resin of ultraviolet ray hardening type applied for adhering a first substrate and a second substrate by irradiating two surfaces of the overlapped first and second substrates with ultraviolet rays.

It is preferable that the irradiation of the overlapped first and second substrates with the ultraviolet rays is performed simultaneously from two sides.

It is preferable that the irradiation of the overlapped first and second substrates with the ultraviolet rays is performed alternately one side after another.

The manufacturing process includes a step of irradiating only the seal resin applied portion with the ultraviolet rays to harden the seal resin applied for adhering the overlapped first and second substrates to each other.

It is preferable that the irradiation of the overlapped first and second substrates with the ultraviolet rays is performed through a shade plate having an ultraviolet ray transmitting region at the seal resin applied portion.

It is preferable that the irradiation of the overlapped first and second substrates with the ultraviolet rays is performed by inducing the ultraviolet rays to the seal resin applied portion through a fiber, etc.

The manufacturing process includes a step of performing a heat treatment, after the irradiation with the ultraviolet rays using any of said process, using a seal resin of ultraviolet ray reaction inducing and thermosetting type.

In the invention, since the shade films for shading the periphery of the display region in the liquid crystal display are formed alternately on the two substrates oppositely arranged and the transparent portion for irradiation with ultraviolet rays is provided on the seal resin used to adhere the two substrates forming a liquid crystal display panel in the region where the film for shading the periphery is formed, not only the peripheral portion of the display region can be prevented from any light leak by securing sufficiently the region where the film for shading the periphery is formed, but also the liquid crystal display can be small-sized by reducing the width of the frame region of the peripheral portion of the display region.

Further, in the portion to which the seal resin is applied, when the shade film or the shade material is formed on both of the two substrates oppositely arranged, by providing alternately the slits for transmission of the ultraviolet rays in the shade film or the shade material, and by providing the transparent portion for irradiating the seal resin with the ultraviolet rays in the periphery shading film region, not only the peripheral portion of the display region can be prevented from any light leak by securing sufficiently the region where the periphery shading film is formed, but also the liquid crystal display can be small-sized by reducing the width of the frame region of the peripheral portion of the display region.

Further, when the shade film or the shade material is formed on both of the two substrates oppositely arranged in the portion to which the seal resin is applied, by providing a condition that opening portions of the slits for transmission of the ultraviolet rays formed on the shade film or the shade material are discontinuous, that is, by providing the overlapping portion where films having the shade characteristic are overlapped in the two substrates, there arises an allowance in alignment at the time of overlapping the two substrates.

Further, in the manufacturing process of a liquid crystal display, when it is necessary to perform the irradiation of the seal resin of ultraviolet ray hardening type used to adhere the two substrates forming the liquid crystal panel oppositely to each other with the ultraviolet rays on both sides of the overlapped two substrates, by performing such irradiation simultaneously from both sides, the step of hardening the seal resin can be performed in a short time, eventually resulting in improvement of productivity.

Further, in the manufacturing process of a liquid crystal display, when it is necessary to perform the irradiation of the seal resin of ultraviolet ray hardening type with the ultraviolet rays on both sides of the overlapped two substrates, by performing such irradiation one side after another, construction of ultraviolet ray irradiator can be simplified.

Further, in the manufacturing process of a liquid crystal display, by performing the irradiation of the seal resin of ultraviolet ray hardening type with the ultraviolet rays only in the region where hardening of the seal resin is required, constituent elements (such as display electrode, orientation film for liquid crystal, etc.) involved in the display characteristic of the liquid crystal display are free from influences of the ultraviolet rays, and it becomes possible to achieve a liquid crystal display of high display quality.

Furthermore, using a seal resin of ultraviolet ray reaction inducing and thermosetting type, even when there remains any portion not irradiated with the ultraviolet rays for any reason, the seal resin can be exactly hardened by heat treatment, and it is possible to achieve a liquid crystal display of high reliability.

Other objects, features and advantages of the invention will become apparent in the course of the following description with reference to the accompanying drawings.

BRIEF DESCRIPTION OF THE DRAWINGS

FIGS. 4(a) and (b) are schematic sectional views showing a liquid crystal display panel of a liquid crystal display according to example 2 of the invention.

FIG. 5 is a schematic plan view showing a liquid crystal display panel of a liquid crystal display according to example 3 of the invention.

DESCRIPTION OF THE PREFERRED EMBODIMENT

EXAMPLE 1

Figure 1:
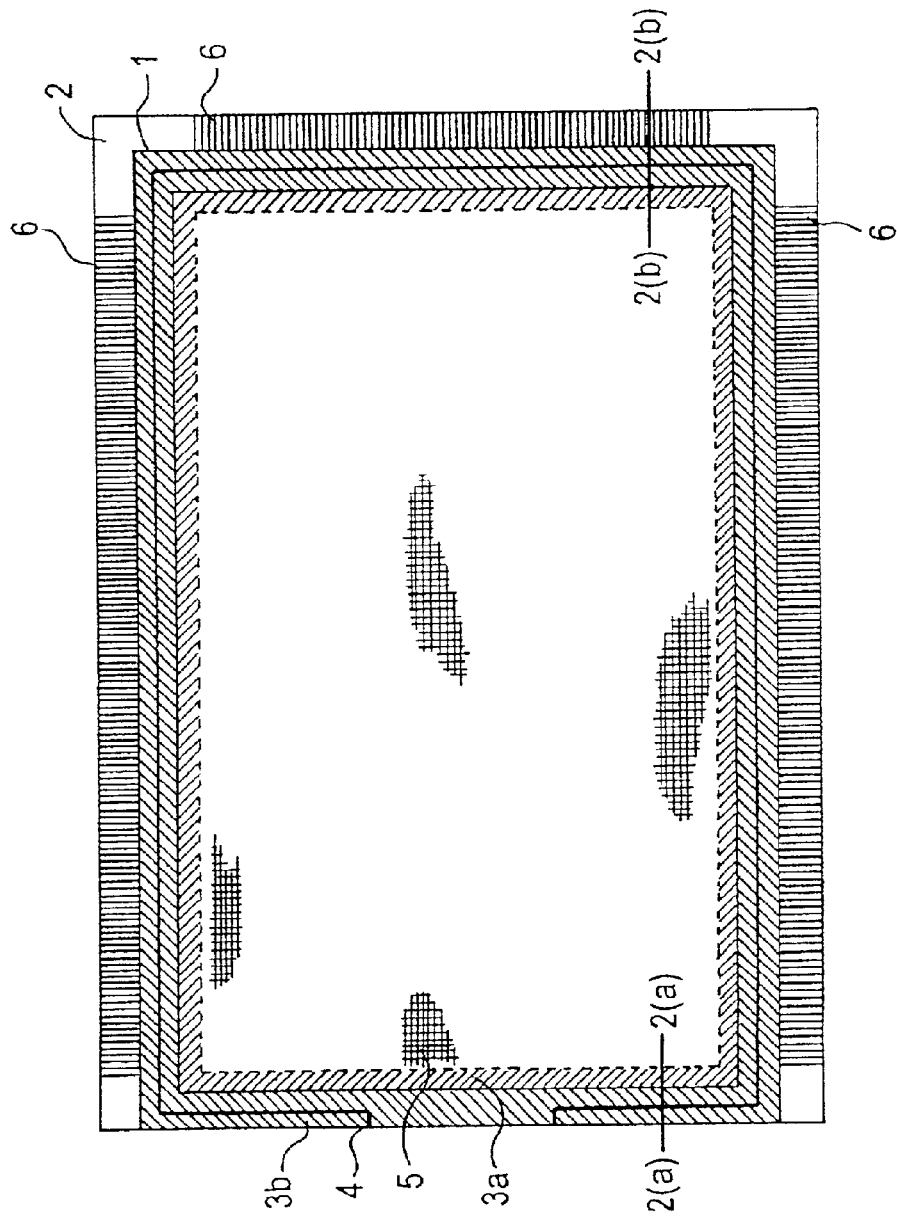
FIG. 1 is a schematic plan view showing a liquid crystal display panel of a liquid crystal display according to example 1 of the present invention.

A liquid crystal display being an example according to the invention is hereinafter described with reference to the drawings. FIG. 1 is a schematic plan view showing a liquid crystal display panel of a liquid crystal display according to example 1 of the invention, FIG. 2(*a*) is a schematic sectional view taken along the line A—A of FIG. 1, and FIG. 2(*b*) is a schematic sectional view taken along the line B—B of FIG. 1.

In the drawings, reference numerals 1 and 2 indicate a first substrate and a second substrate oppositely arranged; numeral 3*a* indicates a shade film formed on the first substrate 1; numeral 3*b* indicates a shade film formed on the second substrate 2; and numeral 4 indicates a seal resin of ultraviolet ray hardening type for adhering the first substrate 1 and the second substrate 2 arranged oppositely to each other so that which a liquid crystal is sealed between the first substrate 1 and the second substrate 2. Numeral 5 indicates a display electrode for displaying a picture formed on the second substrate 2; numeral 6 indicates a display electrode formed on the outside of a display region of the second substrate 2, electrode leading wire, insulating film and others. (hereinafter referred to as electrode leading wire, etc.). In the region indicated as 6, due to the wiring of the shade film or to reflection of the ultraviolet rays occurring as a result of lamination of the transparent film, the ultraviolet rays are partially shaded. Numeral 7 indicates ultraviolet rays with which the seal resin 4 is irradiated for hardening. P indicates a width of a region where a film for shading the periphery of the display region (periphery shading film) of the liquid crystal display panel is formed. Q indicates a width of a transmission region of the ultraviolet rays 7 with which the seal resin 4 is irradiated for hardening.

In the liquid crystal display according to this example, as a periphery shading film for shading the periphery of the display region, the shade film 3*a* is formed on the first substrate 1 extending continuously from the outer edge portion of the display region to a predetermined region, and the shade film 3*b* is formed on the second substrate 2 arranged oppositely to the first substrate 1. The width P of the periphery shading film formed in this manner is a width formed by putting together a width of the shade film 3*a* formed on the first substrate 1 and a width of the shade film 3*b* formed on the second substrate 2. In the first substrate 1, a transparent portion having the width Q corresponding to the portion of the second substrate 2 where shade film 3*b* is formed, is formed, and the seal resin 4 is irradiated with the ultraviolet rays 7 through this transparent portion.

In this example, since the periphery shading films (shade films 3*a* and 3*b*) of the display region are alternately formed on the first substrate 1 (shade film 3*a*) and second substrate 2 (shade film 3*b*) oppositely arranged, and the periphery shading films are formed on the second substrate 2 side in the region where seal resin 4 is irradiated with the ultraviolet rays 7, whereby the transparent portion (width Q) for irradiating the seal resin 4 with the ultraviolet rays 7 can be formed on the first substrate 1 side in the region (width P) where the periphery shading films (shade films 3*a* and 3*b*) are formed. As a result, the width of the frame region of the outer periphery of the display region can be equivalent to the width P of the region where the periphery shading films are formed, and it is possible to achieve a small-sized liquid crystal display by making the frame region small. As the region (width P) where the periphery shading films of the display region are formed is sufficiently secured, it is possible to prevent the peripheral portion of the display region from light leak.

EXAMPLE 2

Figure 3:
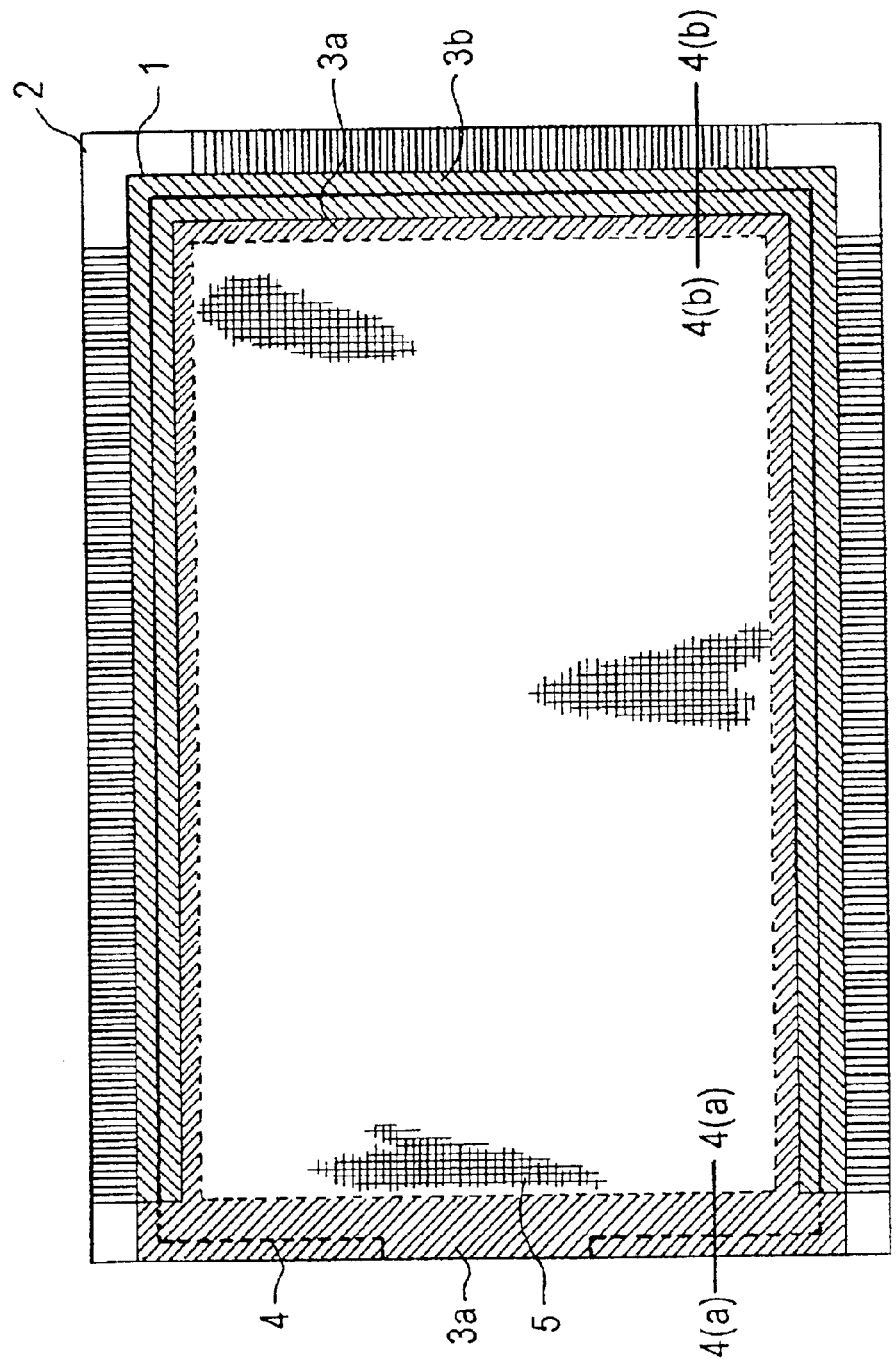
FIG. 3 is a schematic plan view showing a liquid crystal display panel of a liquid crystal display according to example 2 of the invention.

FIG. 3 is a schematic plan view showing a liquid crystal display panel of a liquid crystal display according to example 2 of the invention, FIG. 4(*a*) is a schematic sectional view taken along the line C—C of FIG. 3, and FIG. 4(*b*) is a schematic sectional view taken along the line D—D of FIG. 3.

In the liquid crystal display according to this example, at the portion where the electrode leading wire, etc. 6 are not formed on the second substrate 2 shown in FIG. 4(*a*), the shade film 3*a* is formed on the first substrate 1 extending continuously from the outer edge portion of the display region to the end of the substrate to serve as a periphery shading film of the display region, and the irradiation of the seal resin 4 with the ultraviolet rays 7 is performed from the second substrate 2 side.

In the liquid crystal display according to this example, at the portion where the electrode leading wire, etc. 6 are formed on the second substrate 2 shown in FIG. 4(*b*), the shade film 3*a* is formed on the first substrate 1 extending continuously from the outer edge portion of the display region to the predetermined portion to serve as a periphery shading film of the display region, and the shade film 3*b* is formed on the second substrate 2 arranged oppositely to the first substrate 1. The width P of the periphery shading films formed in this manner is a width formed by putting together the width of the shade film 3*a* formed on the first substrate 1 and the width of the shade film 3*b* formed on the second substrate. In the first substrate 1, a transparent portion having a width Q corresponding to the portion where the shade film 3*b* of the second substrate 2 is formed, is formed on the outside of the shade film 3*a*. And the seal resin 4 is irradiated with the ultraviolet rays 7 from the first substrate 1 side through this transparent portion.

In this example, at the portion where the electrode leading wire, etc. 6 are not formed on the second substrate 2 shown in FIG. 4(*a*), by forming the periphery shading film on the first substrate 1 and by performing the irradiation of the seal resin 4 with the ultraviolet rays 7 from the second substrate 2 side, the entire region (width P) where the periphery shading film (shade film 3a) is formed can be used as the transparent portion (width Q) for irradiating the seal resin 4 with the ultraviolet rays 7. In the portion where the electrode leading wire, etc. 6 are formed on the second substrate 2 shown in FIG. 4(b), by forming alternately the periphery shading films of the display region on the first substrate 1 (shade film 3a) and on the second substrate 2 (shade film 3b) arranged oppositely, and by forming the periphery shading film on the second substrate 2 in the region where the seal resin 4 is irradiated with the ultraviolet rays 7, it is possible to provide the transparent portion (width Q) for irradiating the seal resin 4 with the ultraviolet rays 7 within the region (width P) where the periphery shading films (shade films 3a and 3b) are formed. As a result, the width of the frame region of the outer periphery of the display region can be equivalent to the width P of the region where the periphery shading films are formed, and it is possible to achieve a small-sized liquid crystal display by making the frame region small. As the region (width P) where the periphery shading films of the display region are formed is sufficiently secured, it is possible to prevent the peripheral portion of the display region from light leak.

EXAMPLE 3

Figure 6:
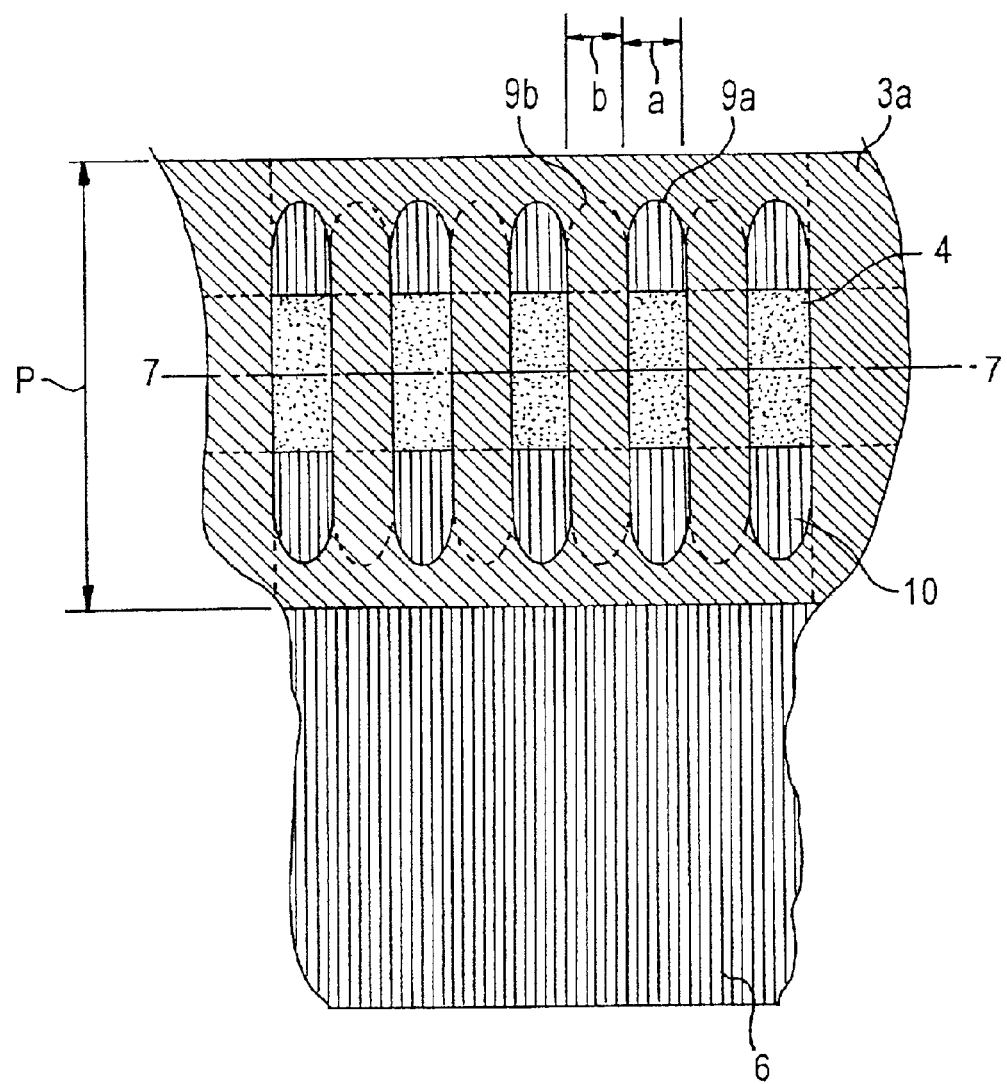
FIG. 6 is a partially enlarged plan view showing a liquid crystal display panel of a liquid crystal display according to example 3 of the invention.
Figure 7:
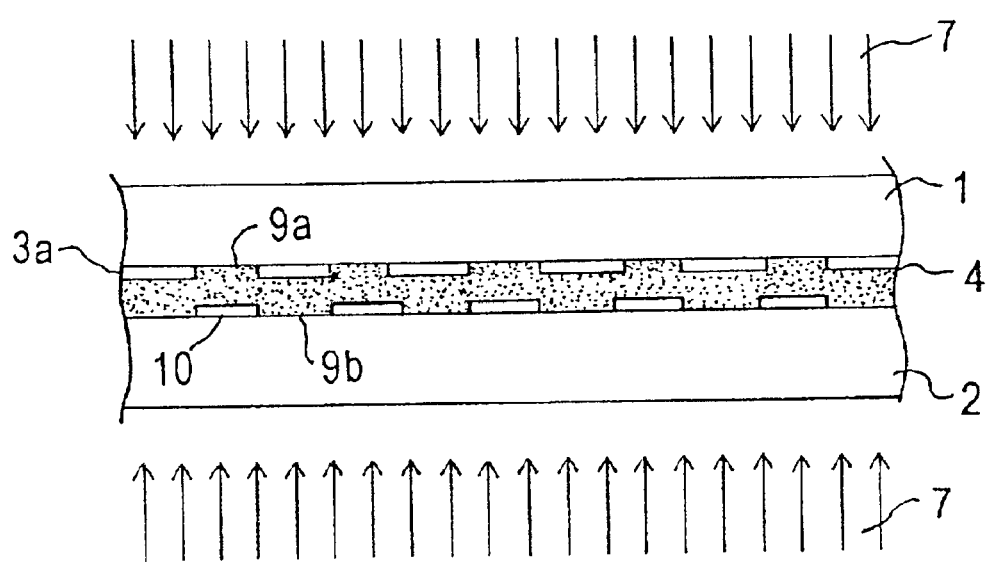
FIG. 7 is a schematic sectional view showing a liquid crystal display panel of a liquid crystal display according to example 3 of the invention.

FIG. 5 is a schematic plan view showing a liquid crystal display panel of a liquid crystal display according to example 3 of the invention, FIG. 6 is an enlarged view of a part E of FIG. 5, and FIG. 7 is a schematic sectional view taken along the line F—F of FIG. 6.

Figure 2:
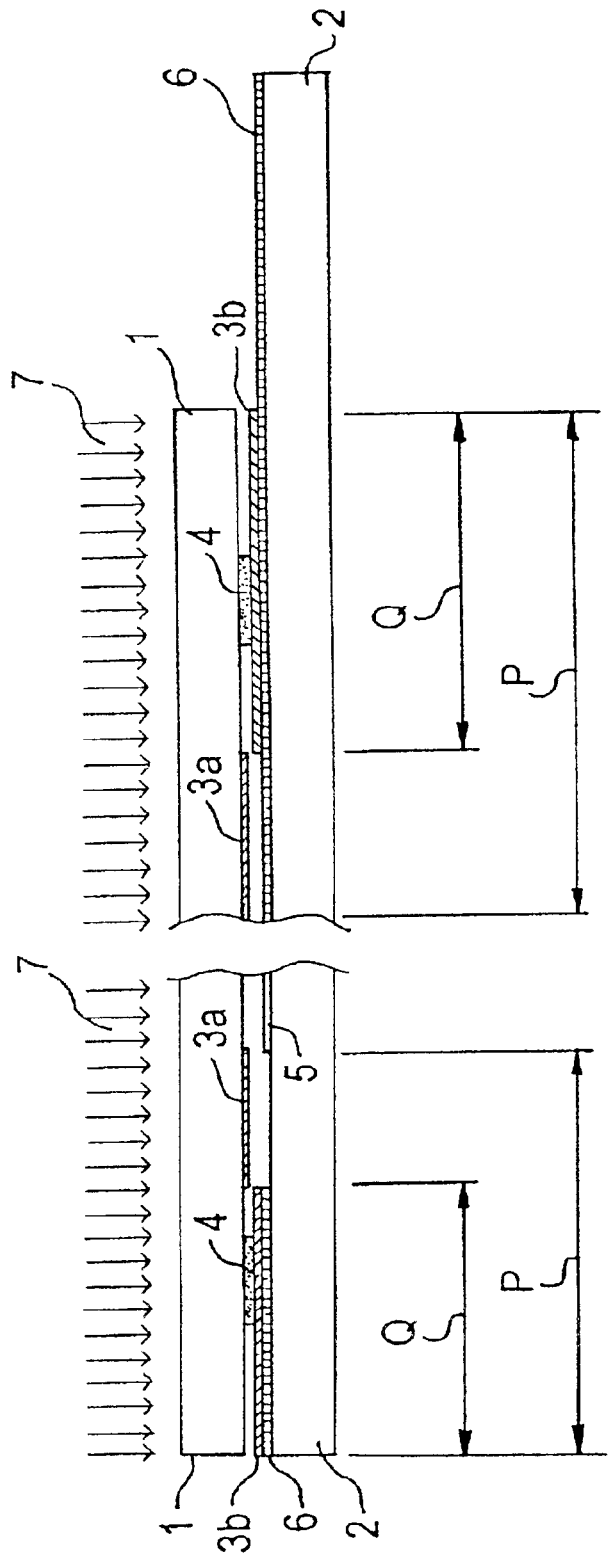
FIGS. 2(a) and (b) are schematic sectional views showing a liquid crystal display panel of a liquid crystal display according to example 1 of the invention.

In the drawings, reference numeral 9a indicates a slit for transmission of the ultraviolet rays formed in the shade film 3a of the first substrate 1, and numeral 9b indicates a slit for transmission of the ultraviolet rays formed in electrode leading wire, etc. 10 having a shading characteristic among the electrode leading wires, etc. 6 provided in the periphery of the second substrate 2. In addition, when the slit 9b is formed in fine wiring portion, it is necessary to form it considering that electric resistance value of the wiring is not influenced. Description of the same parts and portions as those in FIGS. 1 and 2 are omitted herein just by designating the same reference numerals thereto.

In the liquid crystal display according to this example, at the portion where the electrode leading wire, etc. 6 are not formed on the second substrate 2, the shade film 3a is formed on the first substrate 1 extending continuously from the outer edge portion of the display region to the end of the substrate to serve as a periphery shading film of the display region. In the portion where the electrode leading wire, etc. 6 are formed on the second substrate 2 shown in FIG. 6, at the portion to which the seal resin 4 of the shade film 3a formed continuously from the outer edge portion of the display region to the end of the substrate on the first substrate 1 is applied, the slit 9a for transmission of ultraviolet rays having an opening width "a" and an interval "b" is formed. At the portion formed in the peripheral portion of the second substrate 2 and to which the seal resin 4 of the electrode leading wire, etc. 10 having a shading characteristic is applied, the slit 9b having an opening width "a" and an interval "b" is arranged in such a manner as to be alternate with the slit 9a provided in the shade film 3a and to be continuous when the first substrate 1 and the second substrate 2 are arranged oppositely, as shown in FIG. 7. The irradiation of the seal resin 3 with the ultraviolet rays 7 is performed from two sides of the first substrate 1 and second substrate 2 arranged oppositely, and the entire seal resin 4 is irradiated with the ultraviolet rays 7 through the slits 9a and 9b.

In this example, When the periphery shading film (shade film 3a) of the display region is formed on the first substrate 1 having the width P and the films having a transmission characteristic (shade film 3a and electrode leading wire, etc. 10) are formed on both first substrate 1 and second substrate 2 at the portion where the seal resin 4 is applied, by providing the slits 9a and 9b for transmission of ultraviolet rays on the shade film 3a and the electrode leading wire, etc. 10 in such a manner as to be alternately continuous, and by performing the irradiation of the seal resin 4 with the ultraviolet rays 7 from both sides of the first substrate 1 and the second substrate 2 arranged oppositely through the slits 9a and 9b, it becomes possible to provide a transparent portion (slits 9a and 9b) for irradiating the seal resin 4 with the ultraviolet rays 7 within the region (width P) where the shading films are formed. As a result, the width of the frame region of the outer periphery of the display region can be equivalent to the width P of the region where the periphery shading films are formed, and it is possible to achieve a small-sized liquid crystal display by making the frame region small. As the region (width P) where the periphery shading films of the display region are formed is sufficiently secured, it is possible to prevent the peripheral portion of the display region from light leak.

EXAMPLE 4

In the foregoing example 3, the slit 9a provided in the shade film 3a formed on the first substrate 1 and the slit 9b provided in the electrode leading wire, etc. 10 formed on the second substrate 2 arranged oppositely to the first substrate 1 and having a shading characteristic are arranged alternately such that opening portions thereof are continuous. On the other hand, in this example 4, as shown in FIGS. 8 and 9, the opening width "a" of the slit 11a provided in the shade film 3a and the opening width "b" of the slit 11b provided in the electrode leading wire 10 are reduced by a predetermined amount, and therefore when arranging oppositely the first substrate 1 and the second substrate 2, the opening portions of the slits 10a and the 10b are discontinuous.

Figure 8:
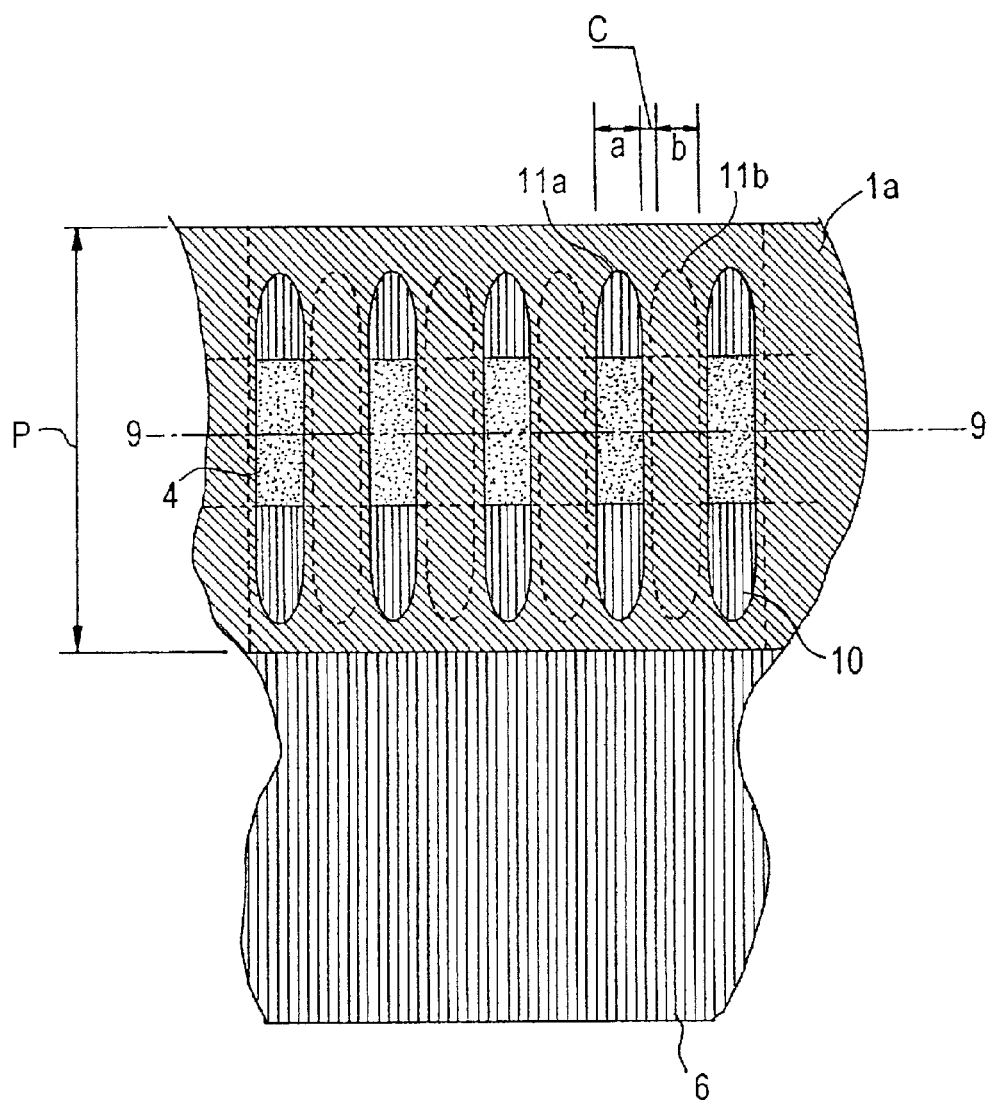
FIG. 8 is a partially enlarged plan view showing a liquid crystal display panel of a liquid crystal display according to example 4 of the invention.
Figure 9:
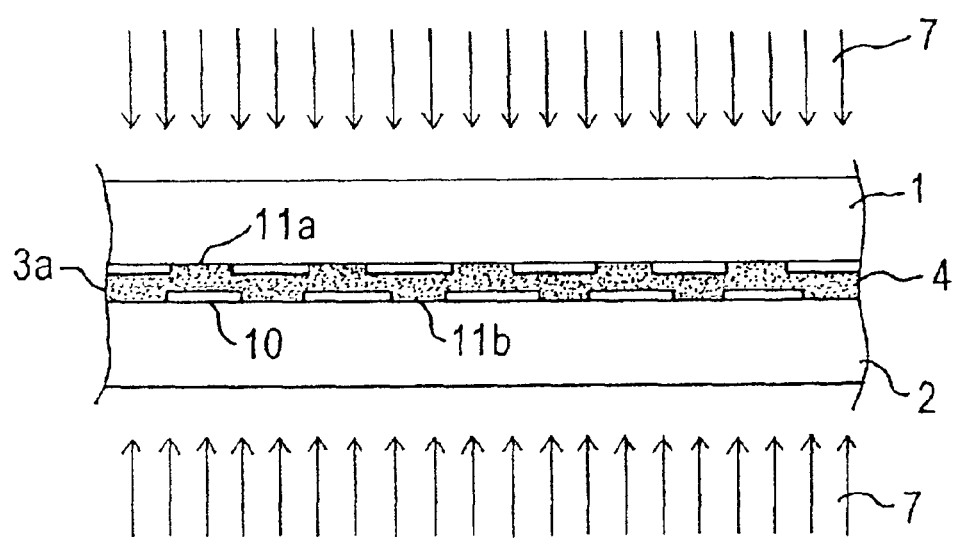
FIG. 9 is a schematic sectional view showing a liquid crystal display panel of a liquid crystal display according to example 4 of the invention.

FIGS. 8 and 9 show example 4, and in which FIG. 8 is an enlarged view of a part corresponding to E of FIG. 5, and FIG. 9 is a schematic sectional view taken along the line G—G of FIG. 8.

In the drawings, reference numeral 11a indicates a slit for transmission of ultraviolet rays formed in the shade film 3a of the first substrate 1; numeral 11b is a slit for transmission of ultraviolet rays formed in the electrode leading wire, etc. 10 having a shading characteristic provided in the peripheral portion of the second substrate; "a" indicates an opening width of the slit 11a; "b" indicates an opening width of the slit 11b; and "c" indicates a width of a distance in opening portion between the slit 11a provided in the first substrate 1 and the slit 11b provided in the second substrate 2 when the first substrate 1 and the second substrate 2 are arranged oppositely, in other word, "c" is an overlapping portion formed in which the films having the shading characteristic (shade film 3a and the electrode leading wire, etc. 10) in the first substrate 1 and the second substrate 2 are formed to be overlapped. This width "c" of the overlapping portion is determined considering an amount being able to harden the seal resin 4 at the overlapping portion of the films having the shading characteristic by oblique incident light of the ultraviolet rays 7 at the time of irradiating the seal resin 4 and scattered light at the seal resin 4 portion.

In this example, not only the same advantage as that in example 3 is achieved, it is possible to have an allowance in alignment of overlapping the first substrate 1 and the second substrate 2.

EXAMPLE 5

Figure 10:
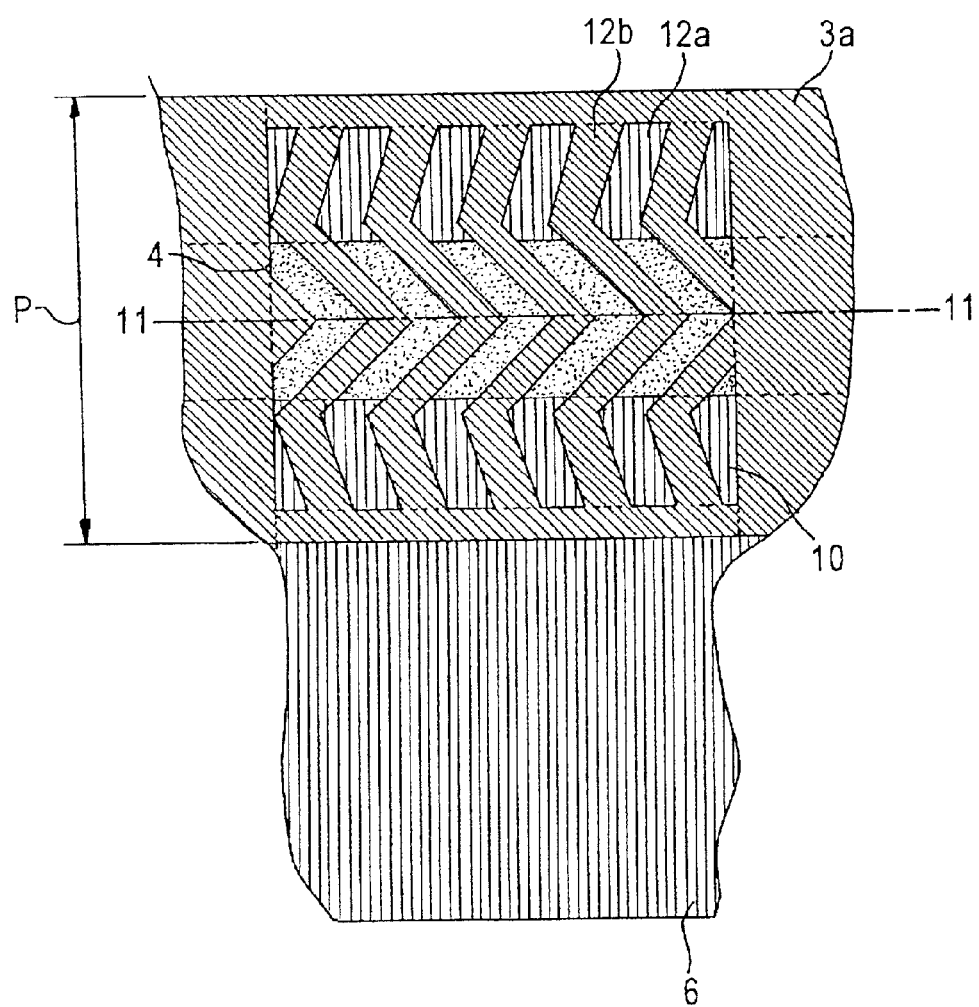
FIG. 10 is a partially enlarged plan view showing a liquid crystal display panel of a liquid crystal display according to example 5 of the invention.
Figure 11:
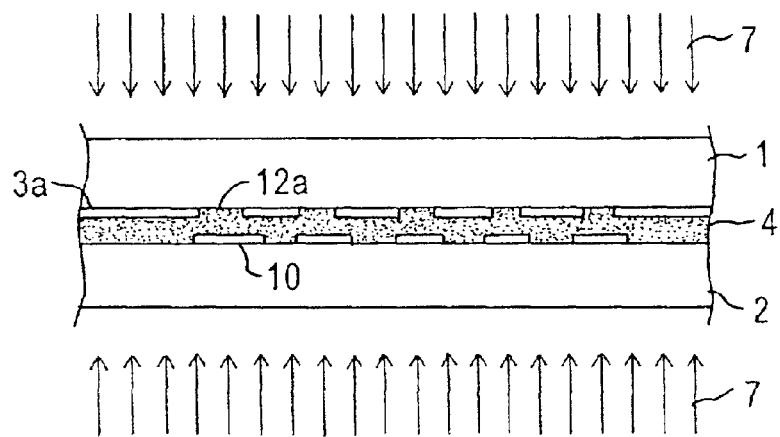
FIG. 11 is a schematic sectional view showing a liquid crystal display panel of a liquid crystal display according to example 5 of the invention.

Though, in example 3, the slits 9a and 9b provided in the shade film 3a formed on the first substrate 1 and in the electrode leading wire, etc. 10 having a shading characteristic formed on the second substrate 2 arranged oppositely to the first substrate 1 are formed to be linear at the portion where the seal resin 4 is applied, as shown in FIGS. 10 and 11, it is also preferable that they are formed to be slits 12a and 12b of any secondary dimensional shape considering appearance and function. In this case, the same advantage as that in example 3 is achieved, and it is possible to improve in prevention of refractive scattered light from slit edge, and in applicability and adherence of the seal resin 4.

EXAMPLE 6

Figure 12:
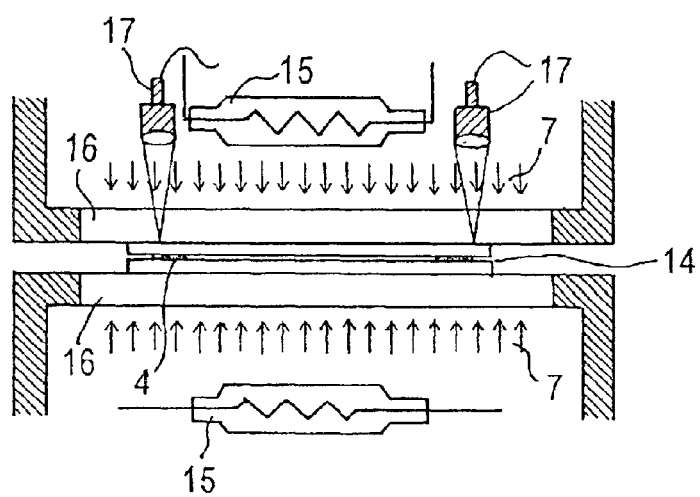
FIG. 12 is a schematic view showing an arrangement of an ultraviolet ray irradiator used in manufacturing a liquid crystal display according to example 6 of the invention.

FIG. 12 is a schematic view to explain a method of irradiating the seal resin 4 of ultraviolet ray hardening type used for adhering the first substrate 1 and the second substrate 2 arranged oppositely and forming a liquid crystal display panel with the ultraviolet rays 7. In the drawing, reference numeral 1 indicates a first substrate, numeral 2 indicates a second substrate, numeral 4 is a seal resin of ultraviolet ray hardening type, and numeral 14 is an overlapped substrate comprising the first substrate 1 and the second substrate 2 arranged oppositely. Numeral 15 is an ultraviolet lamp, numeral 16 is an ultraviolet ray transmission plate for supporting the overlapped substrate 14 and through which ultraviolet rays can transmit, and numeral 17 is an alignment mechanism.

The seal resin 4 in manufacturing the liquid crystal display according to this example is irradiated with the ultraviolet rays 7 from two sides of the overlapped substrate 14 simultaneously on the entire two surfaces, when it is necessary to irradiate the two sides of the overlapped substrate 14 with the ultraviolet rays 7.

In this example, when it is necessary to irradiate the two surfaces of the overlapped substrate 14 with the ultraviolet rays 7 for the irradiation of the seal resin 4 of ultraviolet ray hardening type held between the first substrate 1 and the second substrate 2, the hardening of the seal resin 4 with the ultraviolet rays can be performed in a short time.

EXAMPLE 7

Figures 13A, 13B:
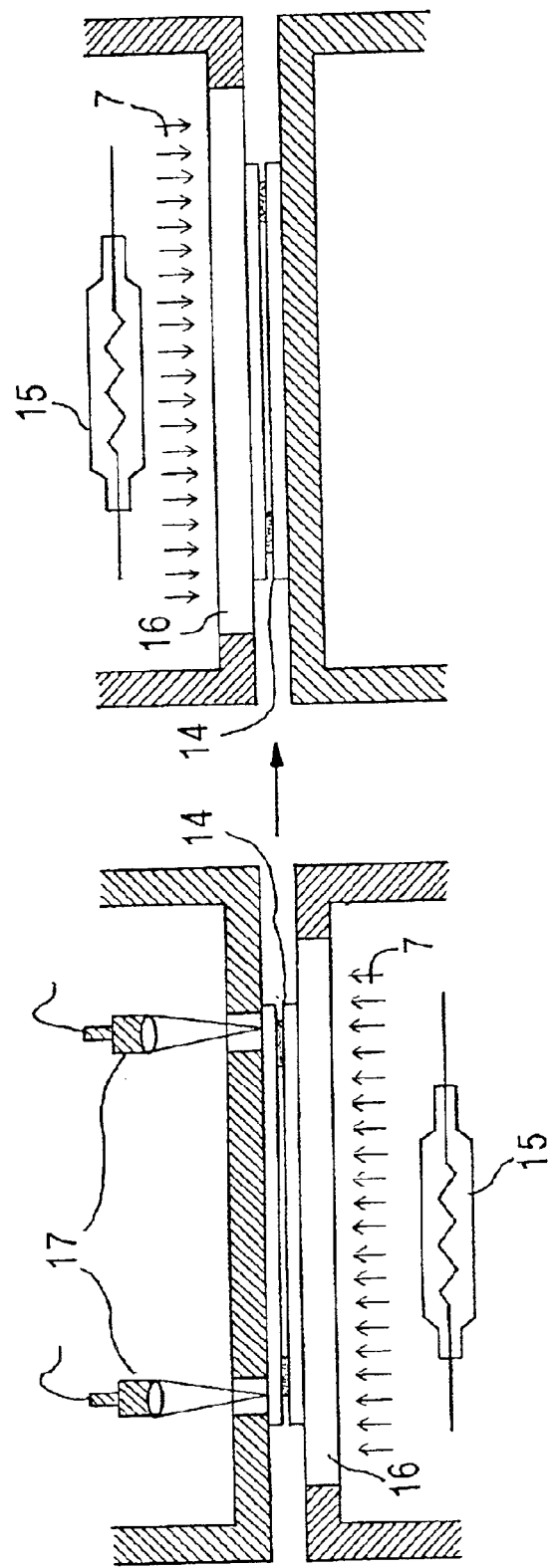
FIGS. 13(a) and (b) are schematic views showing an arrangement of an ultraviolet ray irradiation device used in manufacturing a liquid crystal display according to example 7 of the invention.
Figure 14:
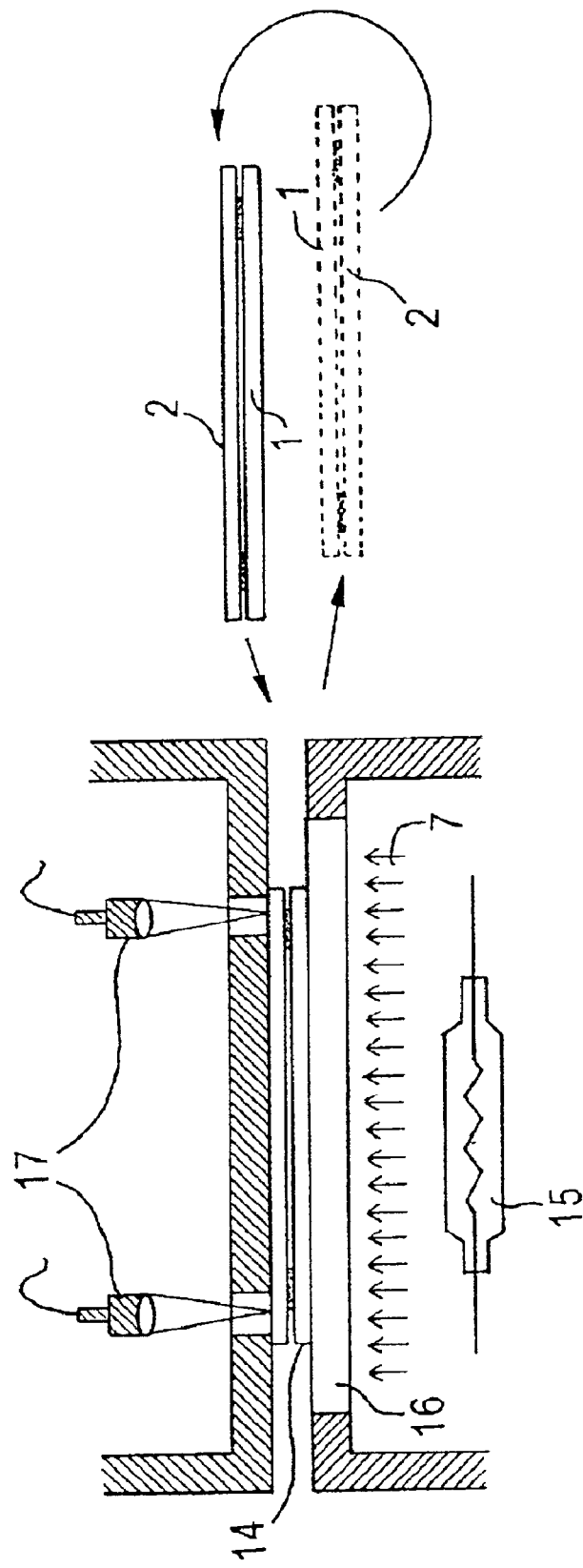
FIG. 14 is a schematic view showing an arrangement of another ultraviolet ray irradiation device used in manufacturing a liquid crystal display according to example 7 of the invention.

Though, in example 6, the irradiation of the seal resin 4 with the ultraviolet rays 7 is performed from both sides of the overlapped substrate 14 simultaneously on the entire two surfaces, the irradiation is performed alternately one side after another in this example 7 as shown in FIG. 13 and FIG. 14.

In the method of irradiating the seal resin 4 with the ultraviolet rays 7 in the manufacturing method according to this example, in order to irradiate the two surfaces of the overlapped substrate 14 with the ultraviolet rays 7, an ultraviolet ray irradiator comprises two sections as shown in FIG. 13. First using an apparatus formed as shown in FIG. 13(a), one side (the second substrate 2 side in this example) of the overlapped substrate 14 is irradiated with the ultraviolet rays 7, then after moving the substrate to another apparatus formed as shown in FIG. 13(b), another side (the second substrate 1 side in this example) is irradiated with the ultraviolet rays 7.

In the irradiation method shown in FIG. 14, first one side (the second substrate 2 side in this example) of the overlapped substrate 14 is irradiated with the ultraviolet rays 7, then after turning over the overlapped substrate 14, another side (the second substrate 1 side in this example) is irradiated with the ultraviolet rays 7.

In this example, even when it is necessary to perform the irradiation of the seal resin 4 of ultraviolet ray hardening type held between the first substrate 1 and the second substrate 2 with the ultraviolet rays 7 on both surfaces of the overlapped substrate 14, arrangement of the ultraviolet ray irradiator can be simplified. In the method shown in FIG. 14, the irradiator can be formed into a single apparatus.

EXAMPLE 8

Figure 15B:
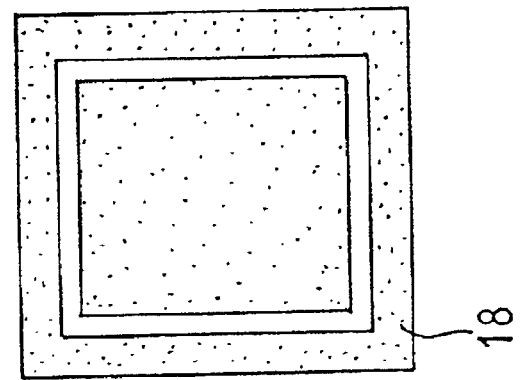
FIGS. 15(*a*) and (*b*) are schematic views showing an arrangement of an ultraviolet ray irradiation device used in manufacturing a liquid crystal display according to example 8 of the invention.
Figure 15A:
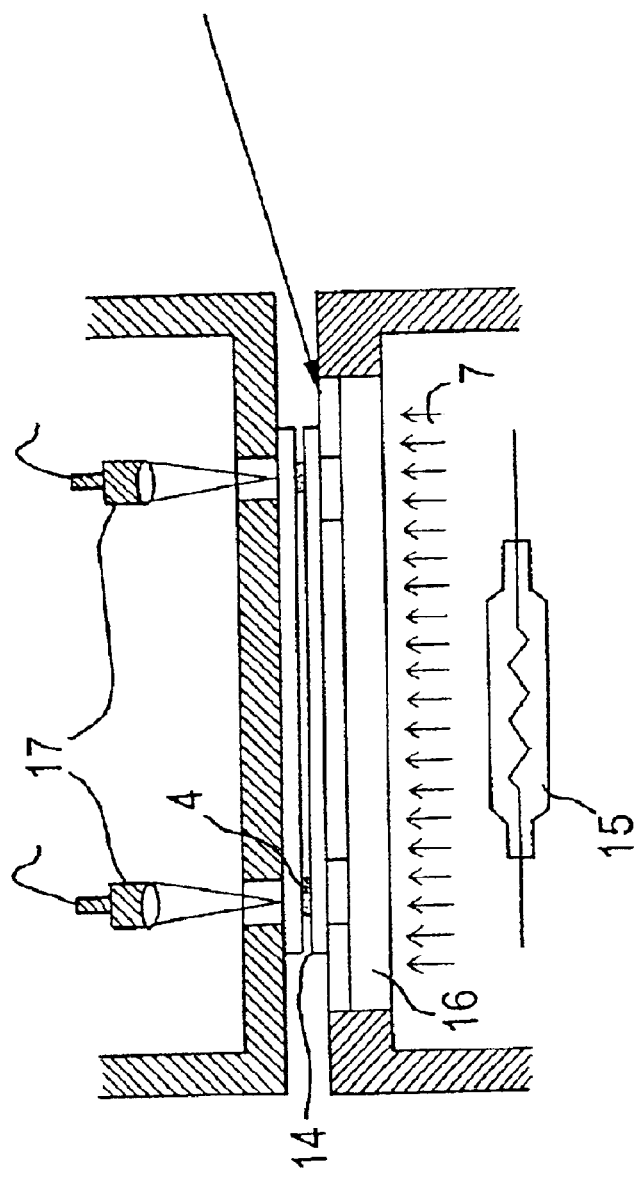

FIG. 15 shows views each to explain a method of irradiating the seal resin 4 of ultraviolet ray hardening type used for adhering oppositely the first substrate 1 and the second substrate 2 forming a liquid crystal display panel with the ultraviolet rays 7 in the manufacturing process of the liquid crystal display described in examples 1, 2, 3, 4 and 5, and in which FIG. 15(b) is a plan view of a shade plate disposed in FIG. 15(a).

In the drawings, reference numeral 18 is a shade plate having a shade film in a region other than that required in transmission of the ultraviolet rays 7 to harden the seal resin 4, and is arranged on the ultraviolet ray transmission plate 16 in an overlapping manner.

In the irradiation method of the seal resin 4 with the ultraviolet rays 7 in the manufacture of the liquid crystal display according to this example, the irradiation is performed through the shade plate 18 provided with the shade film in the region other than that required to transmit the ultraviolet rays 7 for hardening of the seal resin 4.

In addition, the shade plate 18 provided with the shade film according to this example can be applied to the apparatus having an arrangement shown in examples 6 and 7.

In this example, since the irradiation is performed through the shade plate 18 provided with the shade film in the region other than that required to transmit the ultraviolet rays 7 for hardening of the seal resin 4, essential elements (such as display electrode, orientation film for liquid crystal, etc.) involved in the display characteristic of the liquid crystal display are free from influences of the irradiation with the ultraviolet rays.

EXAMPLE 9

Figure 16:
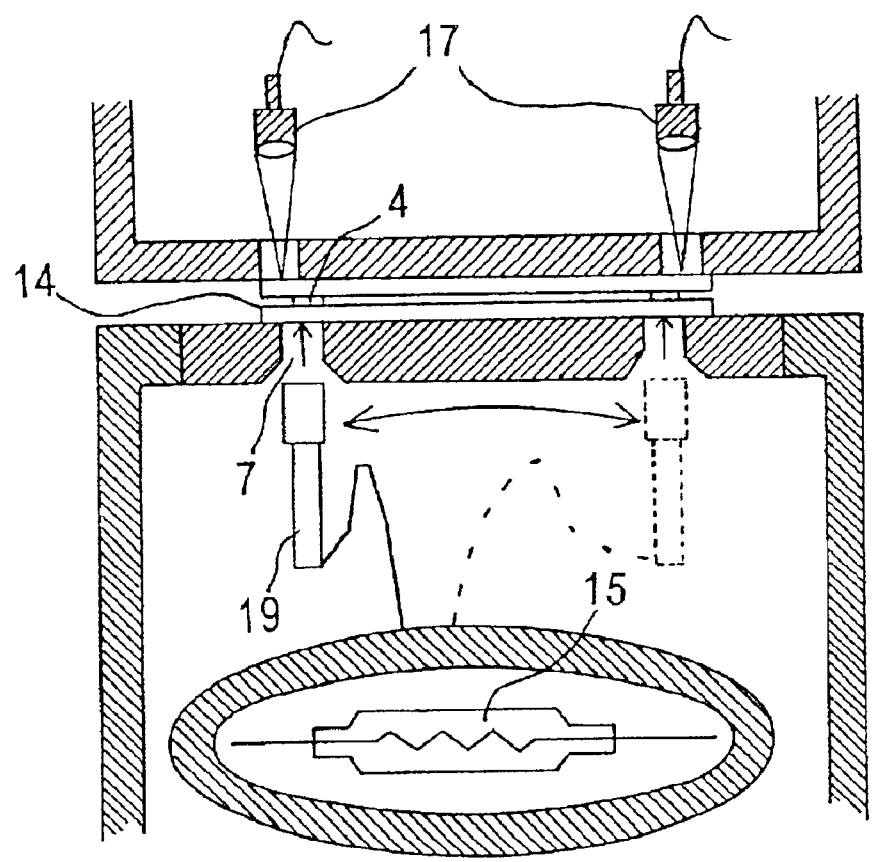
FIG. 16 is a schematic view showing an arrangement of an ultraviolet ray irradiation device used in manufacturing a liquid crystal display according to example 9 of the invention.
Figure 17:
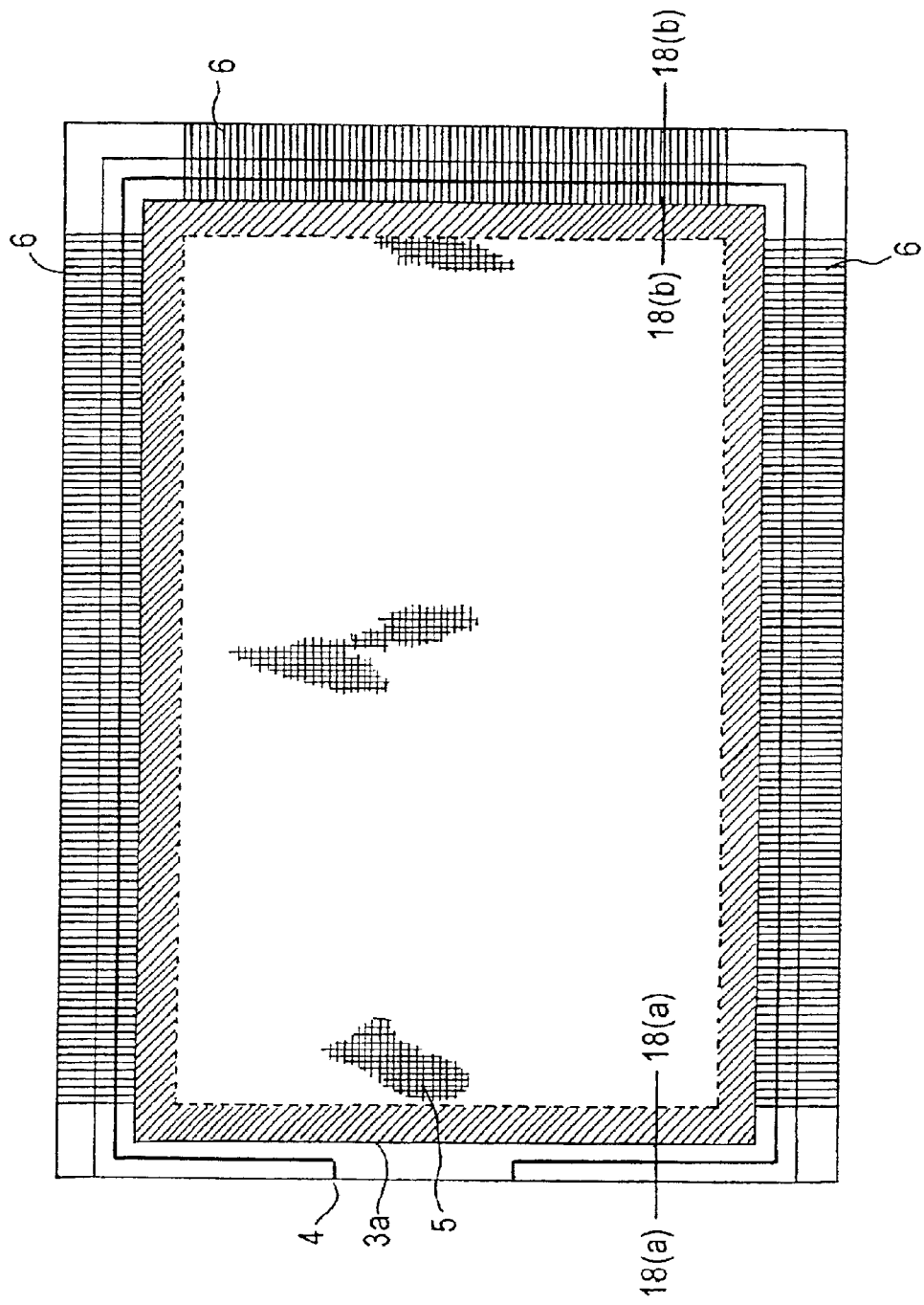
FIG. 17 is a schematic plan view showing a liquid crystal display panel of a liquid crystal display of this type according to the prior art.
Figures 18A, 18B:
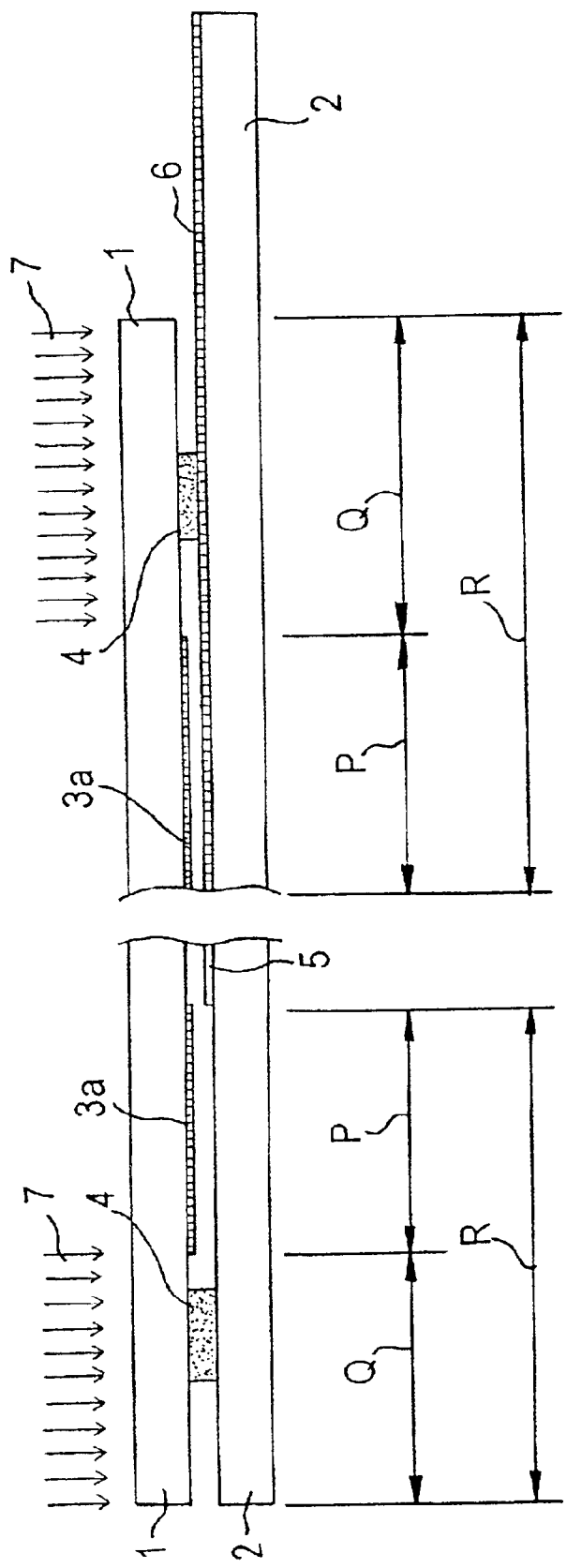
FIGS. 18(*a*) and (*b*) are schematic sectional views showing a liquid crystal display panel of a liquid crystal display according to the prior art.

Though, in example 8, the irradiation of the overlapped substrate 14 with the ultraviolet rays 7 is performed through the shade plate 18 provided with the shade film in the region other than that required to transmit the ultraviolet rays 7 for hardening of the seal resin 4, the same advantage as that in example 8 can be achieved by irradiating only the region required for hardening the seal resin 4 by leading the ultraviolet rays 7 emitted from the ultraviolet lamp 15 through a fiber 19 or the like as shown in FIG. 16.

EXAMPLE 10

Though, in each of the foregoing examples, a resin of ultraviolet ray hardening type is used as the seal resin 4 for adhering in an opposite manner the first substrate 1 and the second substrate 2 forming a liquid crystal display panel of the liquid crystal display, a seal resin of ultraviolet ray reaction inducing thermosetting type (such as acrylic or epoxy mixed resin) is used in this example.

In the seal resin of ultraviolet ray reaction inducing thermosetting type, hardening reaction is induced by the irradiation with ultraviolet rays, and is accelerated by heat treatment.

It should be understood that the foregoing relates to only several examples of the invention and that various changes and modifications may be made in the invention without departing from the spirit and scope thereof.

What is claimed is:

1. A manufacturing process of a liquid crystal display, comprising the steps of:

providing a first substrate having a display region, an outside edge portion positioned outside of the display region, and a first shade film formed on the outer edge portion;

providing a second substrate having a display region opposing to the display region of the first substrate, an outside edge portion opposing to the outside edge portion of the first substrate, electrodes for displaying on the display region, an electrode leading wires having shading characteristics and lead from the display electrodes to an outside of the display region, and a second shade film formed on the outside edge portion of the second substrate;

forming a combination of the first substrate and the second substrate oppositely to each other with a seal resin of an ultraviolet ray hardening type between the outside edge portions of the first and second substrates, wherein the first and second shade films are formed to give a peripheral shading width formed by putting together the width of the first shade film and the width of the second shade film, the seal resin is positioned only between the second shade film of the second substrate and a transparent portion of the first substrate corresponding to the second shade film, and ultraviolet ray can be transmitted through the transparent portion of the first substrate;

sealing a liquid crystal held between the first substrate and the second substrate with the seal resin; and hardening the seal resin by irradiation to only one side of the first substrate of the combination with ultraviolet ray through the transparent portion of the first substrate.

2. The manufacturing process of the liquid crystal display according to claim 1, wherein the irradiation for the one side for the combination is performed only on the seal resin applied portion.

3. The manufacturing process of the liquid crystal display according to claim 2, wherein the irradiation is performed through a shade plate having an ultraviolet ray transmitting region at the seal resin applied portion.

4. The manufacturing process of the liquid crystal display according to claim 2, wherein the irradiation is performed through a fiber at seal resin applied portion.

* * * * *